United States Patent [19]
Lazzarini

[11] 3,754,461
[45] Aug. 28, 1973

[54] FRESH VEGETABLE PROCESSING

[75] Inventor: Louis P. Lazzarini, San Jose, Calif.

[73] Assignee: Genevieve I. Hanscom, Robert Magnuson, Lois J. Thomson as Trustees of the Estate of Roy M. Magnuson, deceased

[22] Filed: June 21, 1971

[21] Appl. No.: 154,783

[52] U.S. Cl. ............................. 99/233.7, 99/233.11
[51] Int. Cl. ........................................... A23n 15/00
[58] Field of Search .................... 146/222, 98, 81 R, 146/84

[56] References Cited
UNITED STATES PATENTS

| | | | |
|---|---|---|---|
| 3,665,987 | 5/1972 | Daugherty | 146/81 R |
| 1,433,630 | 10/1922 | Lewis | 146/98 |
| 3,439,720 | 4/1969 | Neufeld, Jr. | 146/98 X |

*Primary Examiner*—Willie G. Abercrombie
*Attorney*—Allen and Chromy

[57] ABSTRACT

The processing apparatus is adapted to work on washed and cleaned field run fresh vegetable articles such as sweet potatoes, for example, wherein the potatoes are first graded for diameter and separated, for example, into three diameters, and each of the three diameter groups is then separately subjected to a length grading step to sort to four length sub-groups including the extra large sweet potatoes, for example, that go over the end of the conveyors.

Each length subgroup is then placed on a feeding and cutting device such as a shuffle feed mechanism wherein the potatoes are arranged in rows as they are being fed along, and in certain rows adjacent the end of the shuffle feed there are formed article centering pockets or recesses and the potatoes are fed through slicing knives and cut into segments. The respective segments are placed in different conveying positions, and the discharge from each subgroup of the various sized groups by diameter are again mingled, and the potatoes are carried to a canning position or a processing position of some sort.

2 Claims, 3 Drawing Figures

Patented Aug. 28, 1973

INVENTOR.
LOUIS P. LAZZARINI

BY

ATTORNEYS

FRESH VEGETABLE PROCESSING

DESCRIPTION OF THE INVENTION

The present invention relates to the processing of fresh fruit articles such as sweet potatoes for example to prepare them for canning and to that end provide means for producing certain desired cuts or potato segments during the process.

It is a general object of the invention to provide an improved method and apparatus for the processing of fresh fruit and vegetable articles such as potatoes, for example, for subsequent canning.

It is a further object of the invention to provide an improved method and improved apparatus for automatically producing potato segments of uniform length and diameter for canning operations.

It is another object of the invention to provide a method of segregating cut segments by diameter and length of the potatoes so that these may be selectively combined when required in a can for a particular customer.

A further object of the invention is to provide an improved and economical method and apparatus for processing articles such as sweet potatoes.

Other objects and advantages of the invention will be apparent from the following description of a preferred embodiment thereof, taken in conjunction with the attached drawings in which.

Figure 1:
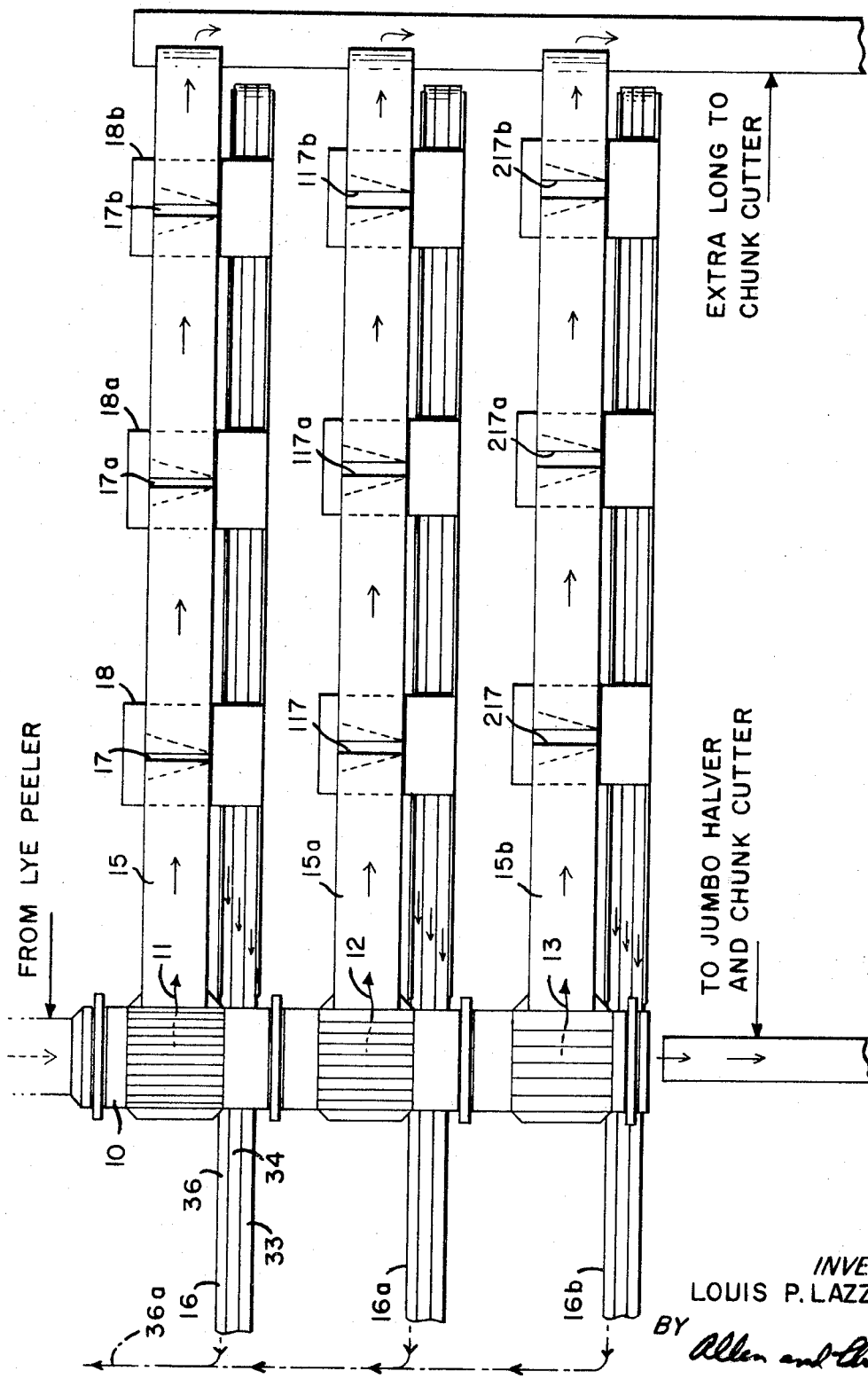
FIG. 1 is a schematic plan view of apparatus for carrying out the invention.

Referring first to FIG. 1, the schematic plan view illustrates diagrammatically the processing and the method of handling sweet potatoes, for example, starting with a field run, and includes first a diagrammatic illustration of a conventional sizing or grading apparatus 10 of the reel and bar type which separates the potatoes in accordance with their diameter and from three of these graders the potatoes are discharged in three groups as indicated by arrow 11 (small diameter size) arrow 12 (medium diameter size) and arrow 13 (large diameter size) on respective transverse conveying means 15, 15a and 15b. The conveying means 15, 15a and 15b lead to length sizing apparatus of a conventional type, for example, the type manufactured by the Ajax Flexible Coupling Co. Inc., Westfield, N. Y. The potatoes are fed lengthwise along a vibrating conveyor such as 15 over transverse slots 17, 17a and 17b of increasing width. The slots 17 are selected in their width so that when a potato of a given length becomes unbalanced it will fall through the slot and a separation by length is effected so that the short length potatoes for a particular diameter go through the slot 17, the medium length potatoes go through the slot 17a and the longer potatoes go through the slot 17b while the extral long potatoes are fed over the end of the conveyor. Referring to FIG. 1 the series of grading slots 17, 17a and 17b, of course, operate on the smallest diameter of the three diameters sorted and the three slots 117, 117a and 117b operate with respect to the medium width of potatoes as indicated by arrow 12 and slots 217, 217a and 217b operate on the largest grade diameter of potatoes. It will be noted also that the width of the slots 17, 17a and 17b is narrower than slots 117 117a and 117b and the width of slots 117, 117a and 117b is narrower than slots 217, 217a and 217b so that grading of the sweet potatoes is done by length and diameter in nine different grades or combinations of grades.

As the potatoes fall through the slots 17, 17a and 17b they fall onto a conventional form of shuffle feed slicer mechanism 18, 18a or 18b of the type for example shown in the U.S. Pat. to Smith et al. No. 3,291,173, and the mechanism 18 receives a mass of indiscriminately arraged articles such as sweet potatoes and aligns these articles in to rows with the potatoes in end-to-end relation and to advance the rows, row-by-row, transversely of their length.

Figure 2:
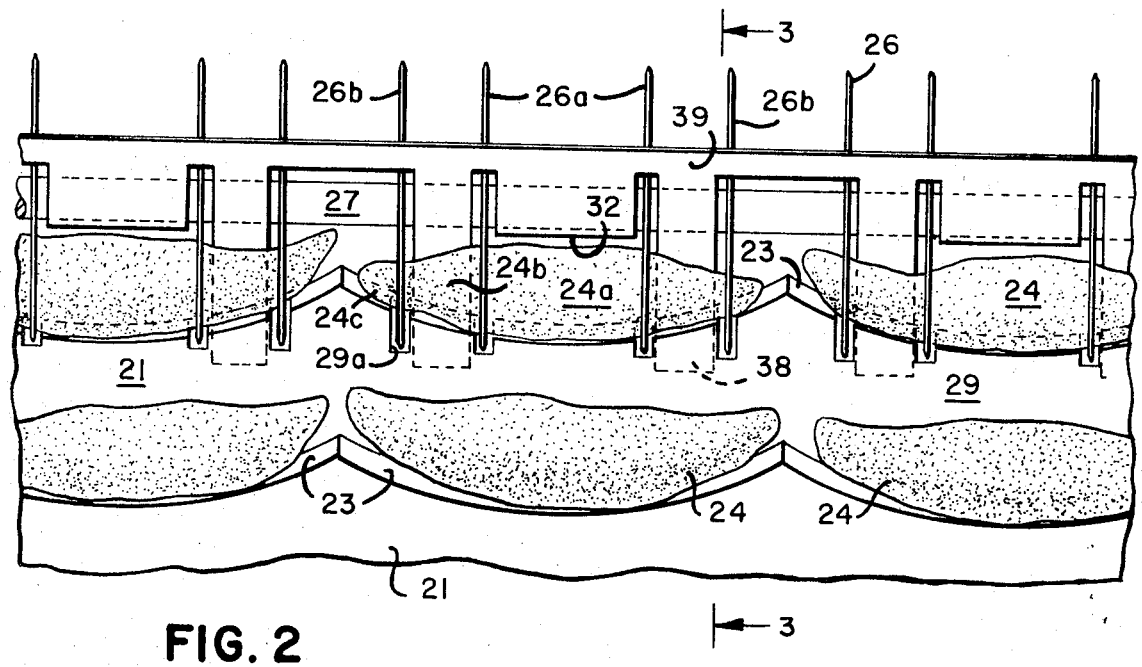
FIG. 2 is a transverse fragmentary sectional view of the means for cutting the potato into segments.

These shuffle feed mechanism include transverse reciprocating shuffle members such as the members 21 (FIGS. 2 and 3) having a series of scallops or arcuate recesses 23 article engaging face which the sweet potatoes 24 will be positioned and centered as they are advanced along the bed of the shuffle feed mechanism. Each of the arcuate recesses 23 in the shuffle member 21 is in a spaced relation with respect to a plurality of rotary cutoff knives 26 (FIGS. 2 and 3) which are carried by a drive shaft 27 and rotate counterclockwise so as to be passing down through recesses 29a the last shuffle member 29 which is slotted at 29a to provide an overlap between the shuffle member and the knives 26. In the present embodiment there are four knives for each of the pockets or scallops 23 of the shuffle members 21. The inner knives 26a are spaced apart to provide a center segment or portion 24a of the potato, and then a pair of outer knives 26b will cut a pair of secondary segments 24b of the potatoes and provide an end or end portions 24c which usually are not canned as a segment but are used as bulk potatoes along with the oversized potatoes.

Figure 3:
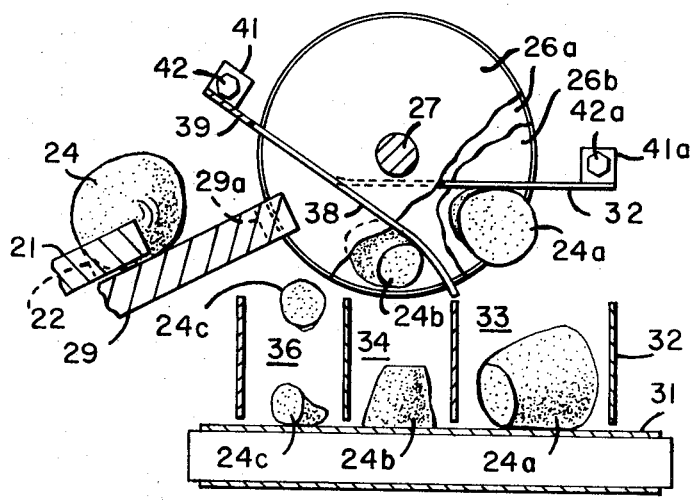
FIG. 3 is a detailed sectional view taken as indicated by the line 3—3 in FIG. 2.

As seen in FIG. 1, the shuffle feed and slicer mechanisms 18, 18a and 18b each discharge onto its respective partitioned conveyor paths 16, 16a and 16b. In FIG. 3, each of these is shown as including a belt-type conveyor 31 having a plurality of partitions 32 thereabove which provide three separate conveyor paths 33, 34 and 36 for the segments 24a, 24b and 24c.

In order to distribute the potato segments in accordance with the desired spacing of these conveyor paths, the conveyor path 36 (FIG. 3) for the end segments is spaced beneath the end of the affixed shuffle member 29 so that the end segments 24c fall freely into this conveyor path. Subsequently, the sections 24b which are carried around by the two knives 26a and 26b which cut off these segments pass beneath respective stripper fingers 38 of a transverse member 39 secured at the ends by suitable ears 41, 41a and bolts 42 and 42a to a suitable frame member (not shown). Centrally of each set of knives 26a and 26b there is provided a bent stripper portion 32 extending horizontally out from the member 39 so that the center segments 24a are discharged into the path 33.

The speed of rotation of the cutting knives preferably is selected at a suitable slow speed, usually at about 15 rpm so that the speed will not tend to throw the potato segments 24a and 24b but simply allows them to drop freely when engaged by the strippers as described.

While I have shown and described a preferred form of the invention, it is apparent that the invention is capable of variation and modification from the forms shown so that the scope thereof should be limited only by the scope of the claims appended hereto.

I claim:

1. The method of preparing fresh food articles such as sweet potatoes for canning which comprises separating a field run of the articles by diameter into a plurality of size groups, subjecting each such size group of the articles to a series of length grading operations to separate each such size group into a plurality of subgroups by length, arranging the articles of each such subgroup into rows with each article positioned lengthwise of the row, feeding the articles row-by-row transversely of the rows, and while so feeding the articles adjusting the lengthwise position of each article with reference to its portion of greatest diameter to place each such article at a desired location, and also while so feeding the articles row-by-row cut each article into a center segment and end segments, and directing the respective cut segments of each such subgroup into respective feed paths for the respective types of segments at least one type of said segments from all of said subgroups being directed to a common feed path.

2. The method of preparing fresh food articles such as sweet potatoes for canning which comprises separating a field run of the articles by diameter into a plurality of size groups, subjecting each such size group of the articles to a series of length grading operations to separate each such size group into a plurality of subgroups by length, arranging the articles of each such subgroup into rows with each article positioned lengthwise of the row, feeding the articles row-by-row transversely of the rows, and while so feeding the articles adjusting the lengthwise position of each article with reference to its portion of greatest diameter to place each such article at a desired location, and also while so feeding the articles row-by-row cut each article into a center segment and end segments, and directing the respective cut segments of each such subgroup into respective feed paths for the respective types of segments, said end segments from each potato including two end pieces unsuitable for canning and two secondary segments suitable for canning.

* * * * *